United States Patent
Petersen et al.

(10) Patent No.: US 11,262,771 B2
(45) Date of Patent: Mar. 1, 2022

(54) HIGH PRESSURE CAPSULE AND HEADER FOR PROCESS FLUID PRESSURE TRANSMITTER

(71) Applicant: Rosemount inc., Shakopee, MN (US)

(72) Inventors: Eric Petersen, Minnetonka, MN (US); Nicholas E. Meyer, Chaksa, MN (US); David M. Strei, Waconia, MN (US)

(73) Assignee: Rosemount Inc., Shakopee, MN (US)

( * ) Notice: Subject to any disclaimer, the term of this patent is extended or adjusted under 35 U.S.C. 154(b) by 144 days.

(21) Appl. No.: 16/579,056

(22) Filed: Sep. 23, 2019

(65) Prior Publication Data

US 2021/0089063 A1    Mar. 25, 2021

(51) Int. Cl.
| | |
|---|---|
| *G01L 7/08* | (2006.01) |
| *G05D 16/20* | (2006.01) |
| *F16L 55/07* | (2006.01) |
| *G01L 9/00* | (2006.01) |

(52) U.S. Cl.
CPC .......... *G05D 16/2013* (2013.01); *F16L 55/07* (2013.01); *F15B 2201/51* (2013.01); *G01L 9/0002* (2013.01); *G01L 9/0004* (2013.01); *G01L 9/0005* (2013.01)

(58) Field of Classification Search
CPC .. G05D 16/2013; F16L 55/07; F15B 2201/51; G01L 9/0002; G01L 9/0004; G01L 9/0005
USPC ......... 137/557; 73/1.57, 715, 724, 725, 706, 73/708
See application file for complete search history.

(56) References Cited

U.S. PATENT DOCUMENTS

| | | | | |
|---|---|---|---|---|
| 4,068,206 A | * | 1/1978 | Popp ..................... | G01L 9/0002 338/36 |
| 4,970,898 A | * | 11/1990 | Walish ................ | G01L 19/0084 73/706 |
| 5,948,988 A | * | 9/1999 | Bodin ................. | G01L 19/0038 73/706 |

(Continued)

FOREIGN PATENT DOCUMENTS

EP     2793010 A2    10/2014

OTHER PUBLICATIONS

International Search Report and Written Opinion for International Patent Application No. PCT/US2020/050120, dated Dec. 8, 2020, 13 pages.

*Primary Examiner* — Minh Q Le (74) *Attorney, Agent, or Firm* — Christopher R. Christenson; Kelly, Holt & Christenson PLLC (57) ABSTRACT

A pressure capsule/header assembly for a process fluid pressure transmitter is provided. An isolator plug has an isolation diaphragm at a first end thereof and a second end spaced from the first end. The isolator plug has a fill fluid passageway fluidically coupling the first end to the second end. A header has a first end configured to carry a pressure sensor and a second end spaced from the first end. The header has at least one electrical interconnect extending from the first end to the second end. A biaxial support ring is disposed about an outer surface of the header. The biaxial support ring and the header define a tapered interference interface therebetween. The header is welded to the isolator plug at a first weld and the biaxial support ring is welded to the isolator plug at a location that is spaced from the second end of the header.

24 Claims, 11 Drawing Sheets

(56) References Cited

U.S. PATENT DOCUMENTS

| | | | | |
|---|---|---|---|---|
| 6,050,145 | A * | 4/2000 | Olson | G01L 19/0084 |
| | | | | 73/706 |
| 6,955,089 | B2 * | 10/2005 | Otsuka | G01L 19/0645 |
| | | | | 438/53 |
| 8,042,401 | B2 * | 10/2011 | Broden | G01L 19/0645 |
| | | | | 73/723 |
| 8,485,040 | B2 * | 7/2013 | Petersen | G01L 19/0663 |
| | | | | 73/706 |
| 8,863,580 | B2 * | 10/2014 | Hausler | G01L 19/0636 |
| | | | | 73/706 |
| 10,048,152 | B2 * | 8/2018 | Fetisov | G01L 9/0064 |
| 10,209,154 | B2 | 2/2019 | Strei et al. | |
| 2001/0015105 | A1 * | 8/2001 | Gerst | G01L 9/0075 |
| | | | | 73/715 |
| 2006/0016265 | A1 * | 1/2006 | Kaneko | G01L 19/0627 |
| | | | | 73/715 |
| 2015/0020600 | A1 * | 1/2015 | Eriksen | G01L 19/06 |
| | | | | 73/706 |
| 2016/0290882 | A1 | 10/2016 | Strei et al. | |
| 2017/0234750 | A1 * | 8/2017 | Aoyama | G01L 19/0645 |
| | | | | 73/706 |

\* cited by examiner

Beneficial Moment Reaction of Capsule Plug Design

FEA Predicted Fatigue Life vs. Ring Interference

FIG. 11

Compressive Preload from Ring Weld Shrinkage

| Test Case / Interference | Burst Range (KSI) | Average Burst (KSI) |
|---|---|---|
| Min Interference / 0.0014" | 51 - 54 | 52.2 |
| Nom Interference / 0.0019" | 56 - 62 | 59.2 |
| Max Interference / 0.0024" | 55 - 61 | 57.5 |
| Max + Interference / 0.0028" | 52 - 70 | 63 |

HIGH PRESSURE CAPSULE AND HEADER FOR PROCESS FLUID PRESSURE TRANSMITTER

BACKGROUND

Industrial process fluid pressure transmitters are used to measure the pressure of an industrial process fluid such as a slurry, liquid, vapor or gas in chemical, pulp, petroleum, pharmaceutical, food and/or other fluid processing plants. Industrial process fluid pressure transmitters are often placed near the process fluids, or in field applications. Often these field applications are subject to harsh and varying environmental conditions that provide challenges for designers of such transmitters.

The sensing element in many process fluid pressure transmitters is often a capacitance-based or resistance-based sensor. An isolation diaphragm is generally used to separate the process fluid from the electrically active sensing element thereby preventing the process fluid, which at times can be harsh, corrosive, dirty, contaminated, or at an extremely elevated temperature, from interacting with the electrical components of the pressure transmitter.

Generally, the process fluid acts against the isolation diaphragm generating a deflection of the isolation diaphragm that moves, or otherwise displaces, a substantially incompressible fill fluid behind the diaphragm which generates an associated movement of the sensing diaphragm of the pressure sensor. The pressure sensor has an electric characteristic, such as capacitance, or resistance that varies with the applied pressure. The electrical characteristic is measured using measurement circuitry within the process fluid pressure transmitter in order to provide an output signal related to the process fluid pressure. The output signal can further be formatted in accordance with known industrial standard communication protocols and transmitted through a process communication loop to other field devices or a process controller.

An in-line process fluid pressure transmitter generally has a single process fluid pressure inlet that can be coupled to a source of process fluid pressure and provides an indication of the process fluid pressure. This indication can be relative to atmosphere, such as a gage indication, or relative to a vacuum, such as an absolute pressure measurement. In-line pressure transmitters that are subject to high maximum working pressure (MWP) present particular design challenges. Simply providing a structure that is able to survive a single application of a maximum working pressure may not be robust enough to survive fatigue with repeated excursions to and beyond the maximum working pressure. Thus, for growing high pressure markets, such as subsea oil and gas wells, it is desirable to provide an in-line process fluid pressure transmitter that is suitable for extended use at higher pressures in such environments.

SUMMARY

A pressure capsule/header assembly for a process fluid pressure transmitter is provided. An isolator plug has an isolation diaphragm at a first end thereof and a second end spaced from the first end. The isolator plug has a fill fluid passageway fluidically coupling the first end to the second end. A header has a first end configured to carry a pressure sensor and a second end spaced from the first end. The header has at least one electrical interconnect extending from the first end to the second end. A biaxial support ring is disposed about an outer surface of the header. The biaxial support ring and the header define a tapered interference interface therebetween. The header is welded to the isolator plug at a first weld and the biaxial support ring is welded to the isolator plug at a location that is spaced from the second end of the header.

DETAILED DESCRIPTION OF ILLUSTRATIVE EMBODIMENTS

Figure 1:
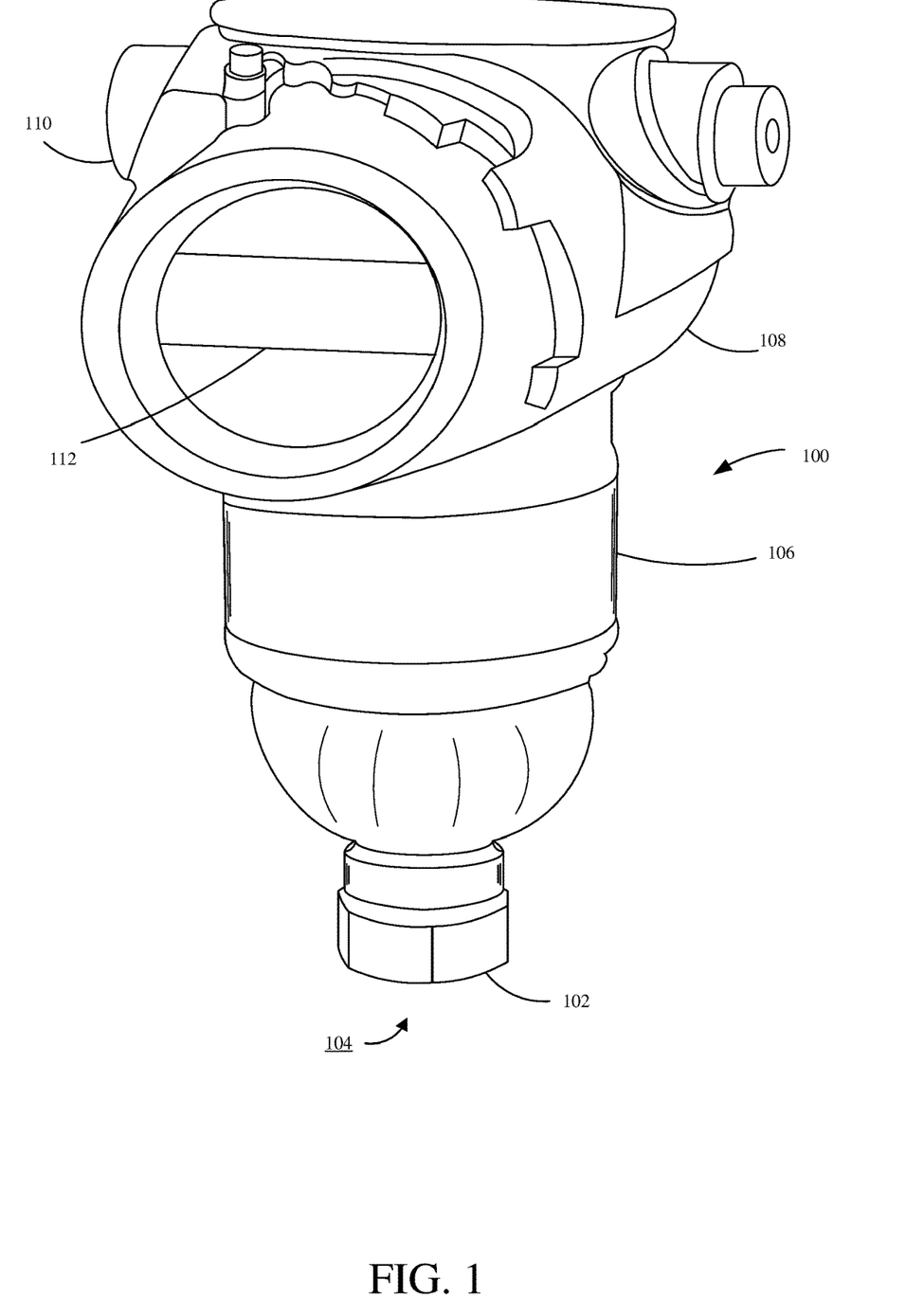
FIG. 1 is a diagrammatic perspective view of an in-line process fluid pressure transmitter with which embodiments of the present invention are particularly useful.

FIG. 1 is a diagrammatic perspective view of an in-line process fluid pressure transmitter with which embodiments of the present invention are particularly useful. Pressure transmitter 100 includes process fluid connector 102 which is configured to be coupled to a source of process fluid 104. Process fluid introduced at connector 102 bears against an isolation diaphragm that physically isolates the process fluid from a pressure sensor, but otherwise conveys the process fluid pressure to the pressure sensor disposed within sensor body 106. The pressure sensor (shown diagrammatically in FIG. 2) has an electrical characteristic, such as capacitance or resistance, which is measured by measurement circuitry in electronics enclosure 108 and converted to a process fluid pressure using suitable calculations by a controller. A process fluid pressure can be conveyed over a process communication loop via wires coupled through conduit 110 and/or displayed locally via display 112. Further, in some implementations, the process fluid pressure may be conveyed wirelessly.

Figure 2:
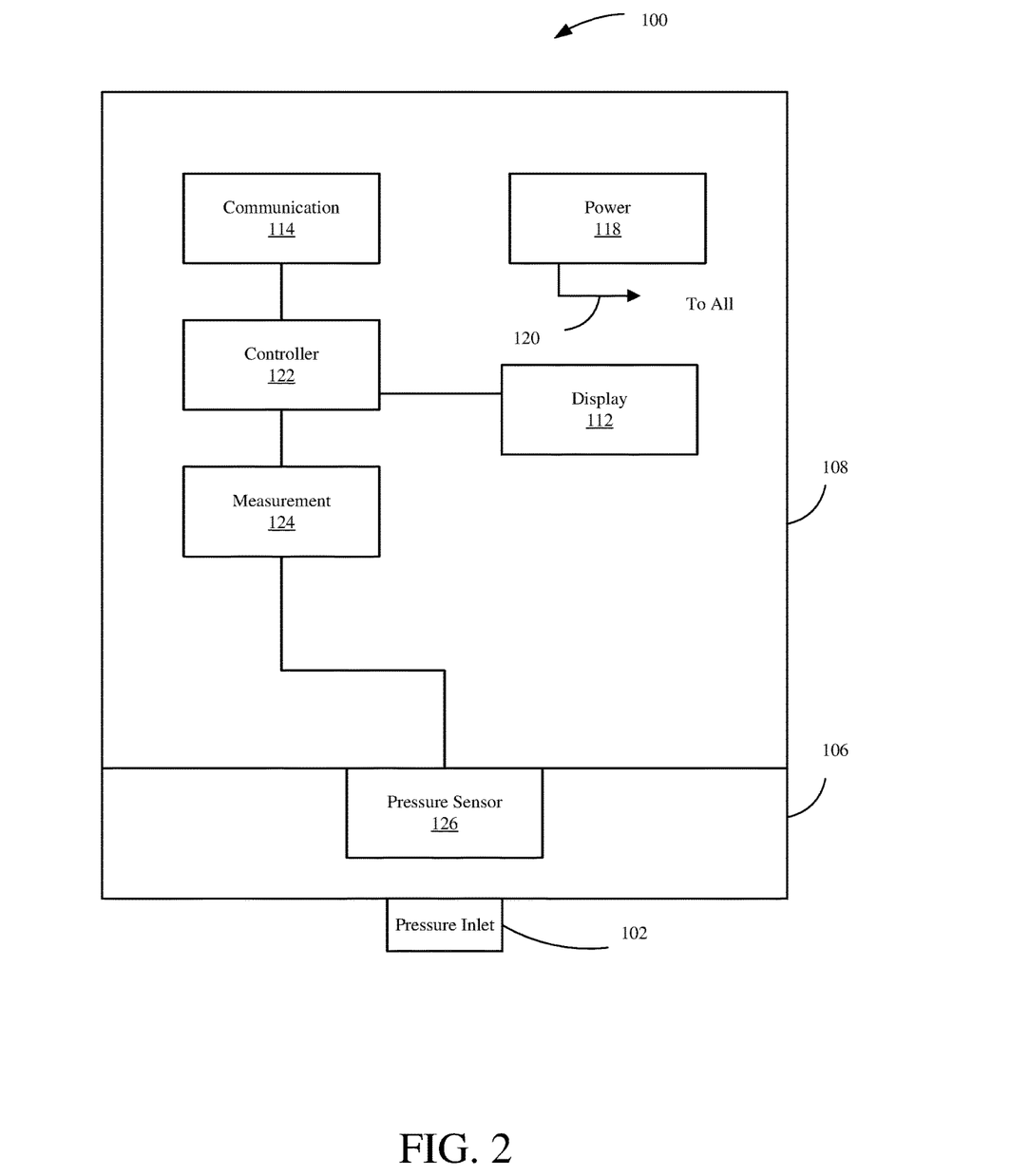
FIG. 2 is a block diagram of in-line process pressure transmitter with which embodiments of the present invention are particularly applicable.

FIG. 2 is a diagrammatic view of in-line process pressure transmitter 100 with which embodiments of the present invention are particularly applicable. Transmitter electronics are disposed within electronics enclosure 108 and include communication circuitry 114, power circuitry 118, controller 122, display 112 and measurement circuitry 124.

Communication circuitry 114 is disposed within electronic enclosure 108 and can be coupled to a process communication loop via a wired or wireless connection. By coupling to process communication loop, communication circuitry 114 allows in-line process pressure transmitter 100 to communicate in accordance with an industry-standard process communication protocol. Moreover, in some embodiments, transmitter 100 may receive all requisite electrical power for operation via its coupling to the process communication loop. Accordingly, pressure transmitter 100 includes power module 118 that, in some embodiments, is coupled to the process communication loop in order to supply suitable operating power to all components of transmitter 100, as indicated at reference numeral 120 labeled "to all." Examples of suitable process communication protocols include the Highway Addressable Remote Transducer (HART®) protocol, the FOUNDATION™ Fieldbus protocol, and others. Further, embodiments of the present invention include wireless process communication, such as that in accordance with IEC 62591 (WirelessHART).

Controller 122 is coupled to communication circuitry 114 as well as measurement circuitry 124 and is configured to cause measurement circuitry 124 to provide a digital indication or measurement from pressure sensor 126. This digital indication is processed, or otherwise operated upon, to generate a process pressure value that controller 122 communicates to other suitable devices via communication circuitry 114. In some embodiments, controller 122 may be a microprocessor. A local display, such as display 112, can also display the process fluid pressure, or other suitable quantities.

Embodiments of the present invention generally stem from a detailed analysis and deep understanding of the present state-of-the-art for high-pressure applications. Before describing some of the various solutions to the problems identified, it will be useful to first describe the present structure and the opportunities for improvement thereon.

Figure 3:
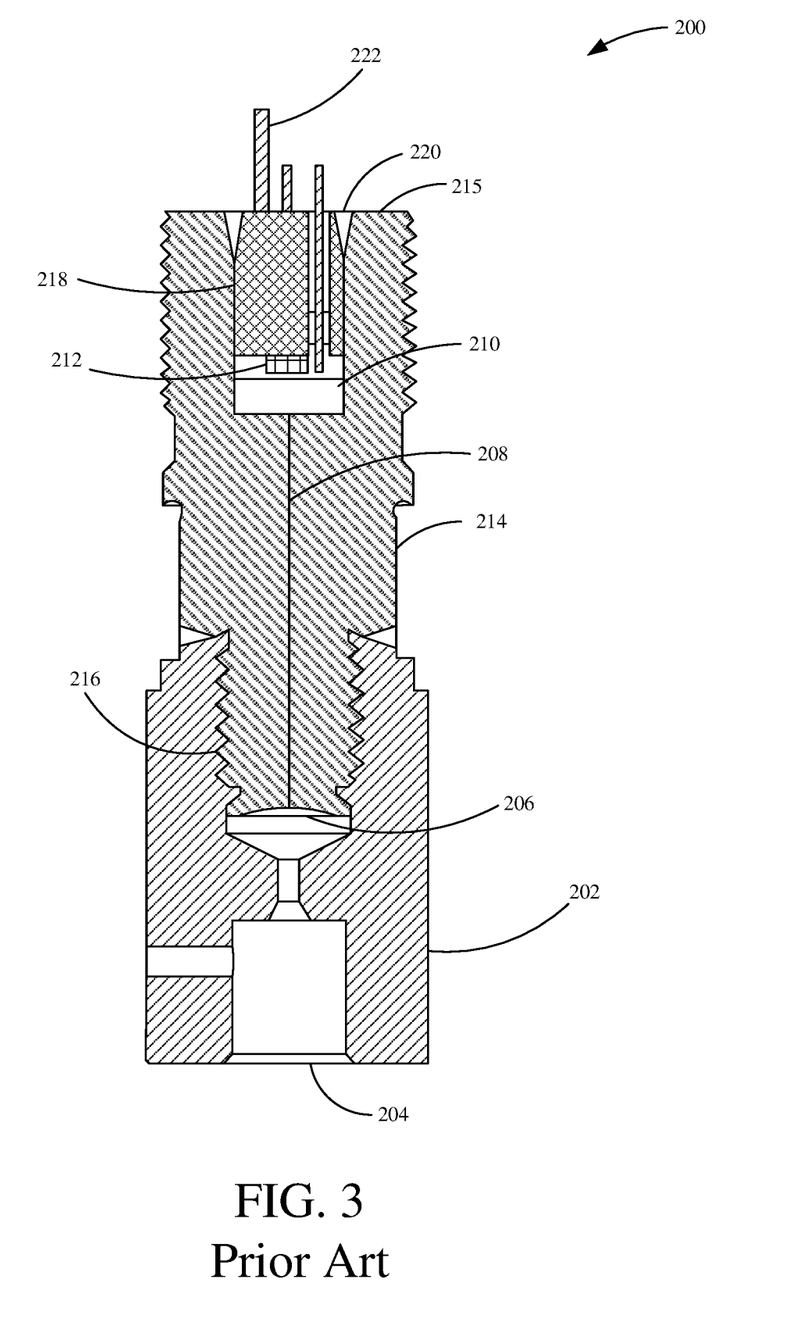
FIG. 3 is a diagrammatic view of a portion of an in-line process fluid pressure transmitter in accordance with the prior art.

FIG. 3 is a diagrammatic view of a portion of an in-line process fluid pressure transmitter in accordance with the prior art. FIG. 3 illustrates process portion 200 having a process connector 202 that is configured to be mounted to otherwise coupled to a source of process fluid which enters via process fluid inlet 204. The process fluid bears against an isolation diaphragm 206 and pressure of the process fluid causes movement of the isolation diaphragm and thus movement of isolation fluid within passageway 208. Passageway 208 is fluidically coupled to chamber 210 within which a pressure sensor 212 resides. Accordingly, as the process fluid bears against isolation diaphragm 206, such pressure is conveyed through the fill fluid to pressure sensor 212 where it is sensed. As can be seen, isolator plug 214 is configured via external threads 216 to be threadably engaged within process connector 202.

Pressure sensor 212 is mounted to header 218. Header 218 is installed in isolator plug 214 via a shrink fit process to enclose pressure sensor 212 within chamber 210. Finally, a weld 220 is applied about the end of header 218 in order to bond and seal header 218 to the upper region 215 of isolator plug 214. As will be set forth in greater detail below, the prior art configuration can be improved upon. More particularly, it is believed that embodiments provided herein will facilitate the provision on a high-pressure capsule and header design that not only provides a higher working pressure range, but also does so with ease of manufacture and higher internal quality. It is believed that improvements can address weld fatigue and/or glass seal compression, as will be described in greater detail below.

The prior art design illustrated with respect to FIG. 3 can be a challenge when it comes to cleanability, due in part from deeper pin wells. When the glassing does become cracked, such cracked glass makes it more difficult to adequately clean contaminants from the assembly. High thermal stresses that occur during process to generate weld 220 (shown in FIG. 3) in combination with residual stresses from the thermal shrink fit result in the formation of surface cracks in the header bulk material. The potential generation of such cracks generally requires that all parts be 100% visually inspected at the end of capsule manufacturing to prevent any severely cracked units from passing further into production without being reworked or discarded. Another difficulty that can occur during the welding process is that the braze that seals the port (such as fill tube 222 shown in FIG. 3) can be heated to such a temperature due to its proximity to the weld that the braze essentially reflows. This is undesired and is not considered to be best practice for a brazed joint.

With an understanding of the previous design and challenges provided by such design, embodiments of the present invention not only remove the thermal shrink fit operation, but also move the header/isolator plug weld to a location that is much less likely to deleteriously affect the header glassing and/or brazing.

Figure 4:
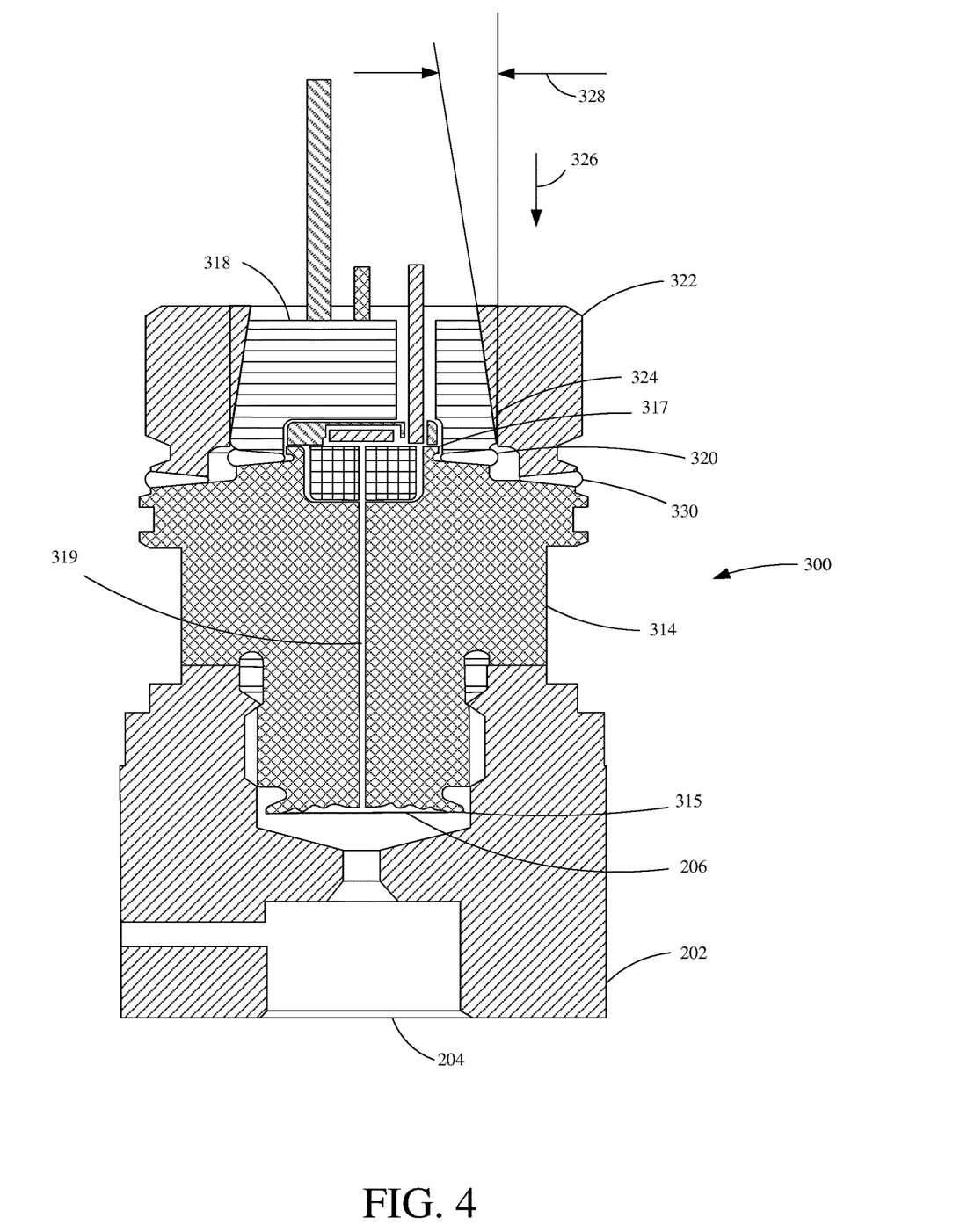
FIG. 4 is a diagrammatic view of a high-pressure capsule and header design for an in-line process fluid pressure transmitter in accordance with an embodiment of the present invention.

FIG. 4 is a diagrammatic view of a high-pressure capsule and header design for an in-line process fluid pressure transmitter in accordance with an embodiment of the present invention. System 300 bears some similarities to system 200, and like components are numbered similarly. As shown, system 300 includes process connector 202 having process fluid inlet 204 and isolation diaphragm 206. Additionally, isolator plug 314 has a first end 315 proximate isolation diaphragm 206 and a second end 317 spaced from first end 315. Fill fluid passageway 319 fluidically coupled first end 315 to second end 317. Isolator plug 314 is configured to threadably engage process connector 202 in much the same way that isolator plug 214 (shown in FIG. 3) engages process connector 202. However, the manner in which header 318 is coupled to isolator plug 314 is significantly different than the design shown in FIG. 3. In particular, header 318 is welded to isolator plug 314 at header weld 320 proximate second end 317 of isolator plug 314. In one embodiment, weld 320 is a laser weld. In another embodiment, weld 320 may be a projection weld. In yet another embodiment, weld 320 is a combination of a laser weld and a projection weld. Preferably, weld 320 is a full penetration weld. However, embodiments described herein can be practiced where weld 320 is partial penetration weld.

Weld 320 encircles and seals header 318 to isolator plug 314. Thus, header weld 320 is a continuous weld that entirely circumscribes the interface between header 318 and isolator plug 314. Weld 320 is generated before biaxial support ring 322 is placed on the assembly.

Header 318 is configured to carry or otherwise mount a pressure sensor such that the pressure sensor is operably coupled to process fluid pressure. Header 318 also includes one or more high pressure electrical feedthroughs that are sealed with glass or another suitable high pressure material. Further, header 318 also includes a fill fluid passageway that is configured to allow fill fluid to be introduced into passageway 319 during assembly of the process fluid pressure transmitter Once header weld 320 is generated, biaxial support ring 322 is slid over the outside diameter 324 of header 318 in the direction indicated by arrow 326, then pressed down over header 318 until it contacts plug 314. Additionally, as shown by exaggerated angle 328, the interface between the outside diameter of header 318 and the inside diameter of biaxial support ring 322 is configured to generate a tapered interference fit and provides a self-locking taper angle. In one embodiment, this self-locking taper angle is approximately ¼ inch in the radial direction per foot in the axial direction. When biaxial support ring 322 is placed over header 318, support ring 322 is welded to isolator plug 314 at ring weld 330, proximate weld 320 and spaced from the upper surface of header 318.

Figure 5:
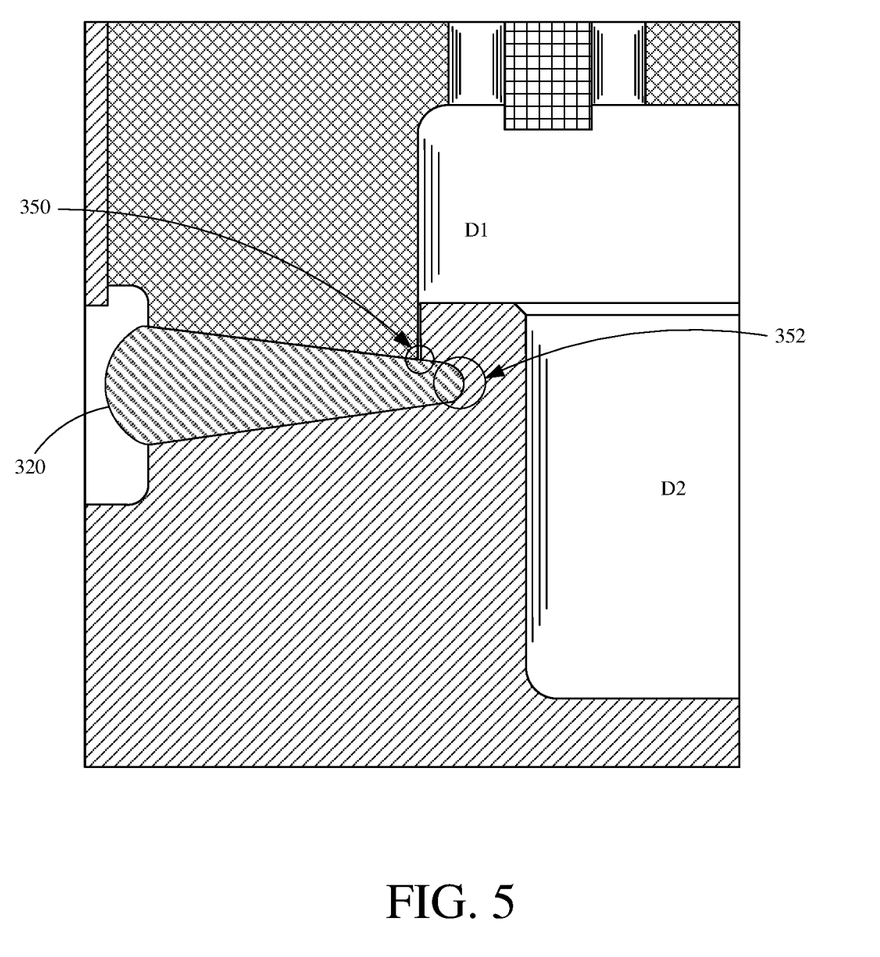
FIG. 5 is a diagrammatic enlarged view of a cross section of header weld in accordance with an embodiment of the present invention.

FIG. 5 is a diagrammatic enlarged view of a cross section of header weld 320. Arrow 350 indicates the portion on weld 320 that is a stress concentration. Additionally, arrow 352 indicates a location of most weld defects. The header is radially welded to the capsule plug and is designed to have the weld fully penetrate the header and into the capsule plug. By accomplishing this, fatigue life of the weld is significantly improved by placing the root of the weld (where there is high variation due to weld penetration and defects) in compression. This also benefits manufacturing by providing a large range of acceptable weld penetrations (+/−0.020" compared to +/−0.010") for the design shown with respect to FIG. 3. Further, the design improves manufacturing by facilitating weld penetration verification as a visual check can easily determine if the weld penetrated into the plug feature.

To mitigate temperature exposure during the weld process, the placement of weld 320 and the depth of die pocket D1 is designed such that the heat load is sufficiently isolated from the critical components of the system, such as the sensor, braze, and glass-metal seals. Given the manufacturability improvements afforded by the D1 die pocket, temperature can actually be varied fairly substantially during the welding process.

Figure 6:
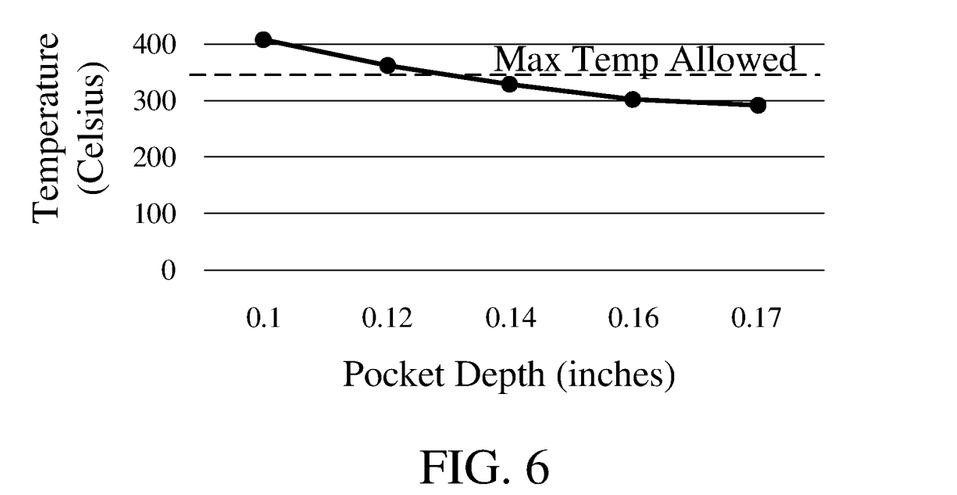
FIG. 6 is a chart of temperature as a function of pocket depth in accordance with an embodiment of the present invention.

FIG. 6 is a chart of temperature as a function of pocket depth in accordance with an embodiment of the present invention. There is a desire to keep the glass temperature below 310° Celsius. As can be seen, this generally suggests a pocket depth of at least 0.14" will achieve the desired maximum glass temperature.

Figure 7:
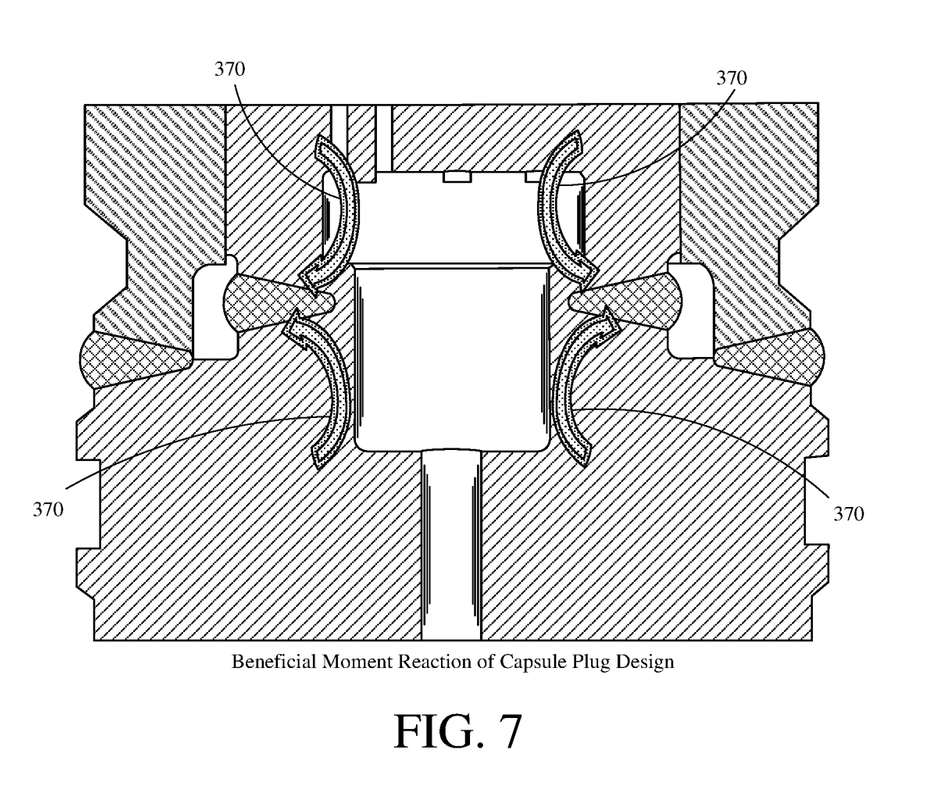
FIG. 7 is an enlarged diagrammatic view of a header weld region illustrating beneficial moments generated relative to the header weld in accordance with an embodiment of the present invention.

FIG. 7 is an enlarged diagrammatic view of a header weld region illustrating beneficial moments generated relative to the header weld in accordance with an embodiment of the present invention. For the capsule plug design, the geometry is improved to accommodate the header and the ring, as well as to improve fatigue life by placing the header-plug weld in the center of cavity between the isolator plug and the header. Placing the assembly weld in the middle of the cavity produces a compressive load at the root of the weld during pressure loading, thereby producing a design that works even with incomplete weld penetration or voids or other non-idealities at the root of the weld. By optimizing or improving the bore diameter and depth, a beneficial moment is induced, as shown in FIG. 7. The beneficial moment is indicated by arrows 370 that place the root of the weld in compression. It is believed that this will reduce the stress of the weld at location 350 (shown in FIG. 5) at high pressures and further improve fatigue life.

Figure 8:
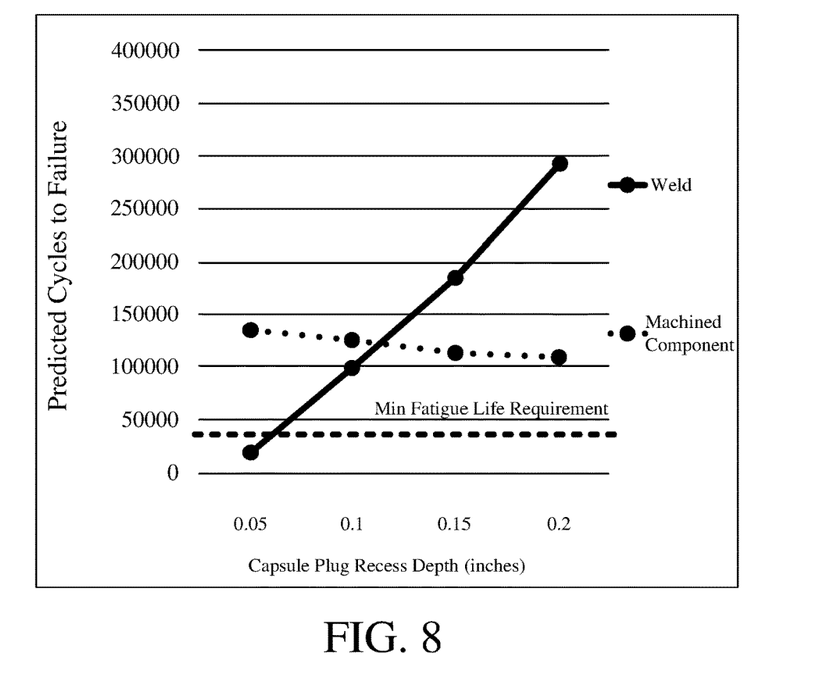
FIG. 8 is a chart of predicted cycles to failure versus capsule plug recess depth in accordance with an embodiment of the present invention.

FIG. 8 is a chart of predicted cycles to failure versus capsule plug recess depth in accordance with an embodiment of the present invention. FIG. 8 illustrate fatigue life (in predicted cycles to failure) of the header weld versus capsule plug recess depth. By adjusting the capsule plug recess depth, the fatigue life of the welded joint (typically the weakest link) can be significantly improved. Additionally, the machined component can be inspected prior to assembly for defects that could reduce their fatigue life.

Figure 9:
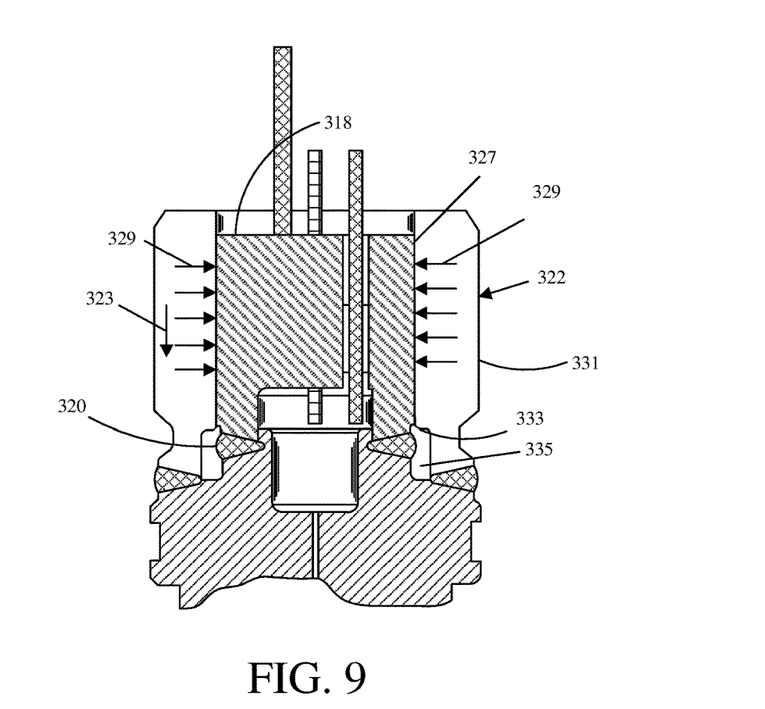
FIG. 9 is a cross sectional view showing features of a biaxial support ring in accordance with an embodiment of the present invention.

FIG. 9 is a cross sectional view showing features of a biaxial support ring in accordance with an embodiment of the present invention. One of the important elements of embodiments of the present invention is the utilization of biaxial support ring 322. Biaxial support ring 322 is assembled onto header 318, as shown, via a tapered press fit at interface 327, which ensures intimate contact between biaxial support ring 322 and header 318. This type of fit adds additional compression, as indicated at arrows 329 to the glass-seals and prevents the pressurized area from bending, both enabling higher burst pressure and longer fatigue life. The illustrated embodiment uses a taper angle of ¼ inch/foot which is a standard taper angle and offers inherent self-locking. The self-locking joint is a result of the coefficient of friction between the surfaces being greater than the retraction force required to separate. For this to occur, any angle less than 7 degrees is considered "self-locking." For final installation into the housing, the ring 322 contains threads 331 on its outer diameter which are used to install the capsule assembly into the transmitter housing. Additionally, FIG. 9 shows biaxial weld ring 322 having edge break 333 in the form of a radius that is configured to prevent material plowing, during assembly. Further, weld ring 322 also includes relief portion 335 having an inner diameter that is larger than the outer diameter of header 318. The interference from the tapered press fit induces an inward compressive stress that serves to enable high-pressure capability by counteracting the pressurized cavity of the structure and providing additional support to the glass-metal seals, thereby allowing higher pressures to be achieved. In order to prevent the glassing from being over-stressed, the ring interference is designed to keep the tensile stresses of the glass under the maximum allowable tensile limit. Bi-axial support ring 322 can also carry loads in the axial direction of header 318 because of the taper, further reducing stress on weld 320. Axial load is indicated by arrow 323.

Figure 10:
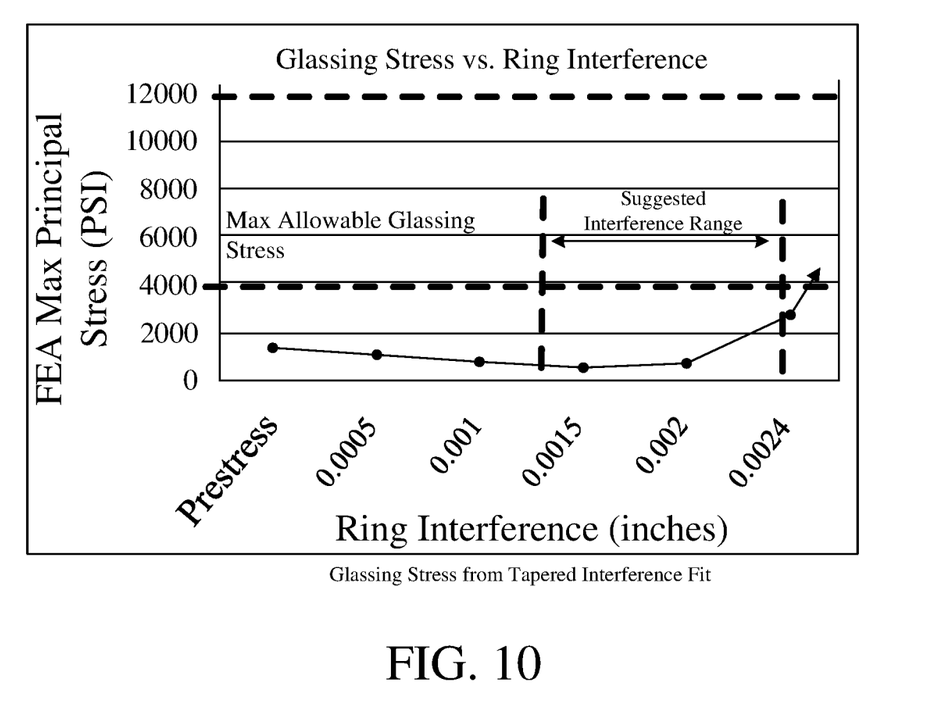
FIG. 10 is a chart of FEA maximum principle stress versus ring interference in accordance with an embodiment of the present invention.

FIG. 10 is a chart of FEA maximum principle stress versus ring interference in accordance with an embodiment of the present invention. As shown, all of the ring interference values ranging from pre-stress through 0.0024 result in a FEA maximum principal stress that is less than the maximal allowable glassing stress. Accordingly, it is believed that useful interference fits can be achieved without damaging, or otherwise affecting the glass. It should be noted that some embodiments described herein are described with respect to specific dimensions. Such description is only provided in order to illustrate a real world example and relative sizes of components. Those skilled in the art will recognize that changes can be made in various dimensions and shapes without departing from the spirit and scope of the invention.

Along with providing support for the glass-metal seals, the biaxial ring also benefits fatigue capability by counteracting the bowing of the header for an internal pressure. This reduces the alternating stresses in both the header 318 and the header weld 320. For additional benefit, the taper also allows for more efficient axial load sharing between the outside ring weld and the inside header weld, further providing fatigue life as described above.

Figure 11:
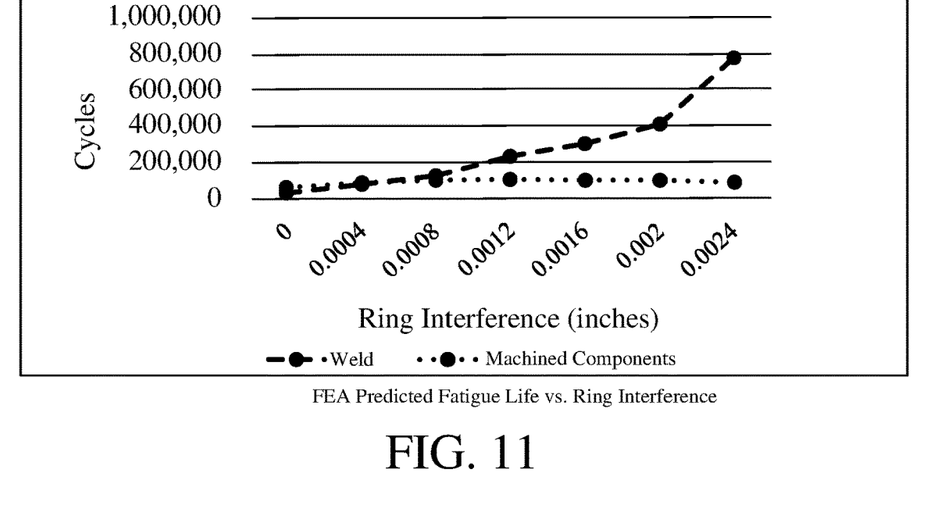
FIG. 11 is a chart of cycles to predicted failure for varying ring interference for a weld and machined components in accordance with an embodiment of the present invention.

FIG. 11 is a chart of FEA predicted fatigue life versus ring interference in accordance with an embodiment of the present invention. As can be seen, at a ring interference of 0.0024, the predicted cycles to failure for the weld exceed 800,000 cycles. Accordingly, it is believed that embodiments of the present invention set forth herein will not only provide higher working pressure, but also a more robust structure that has an improved functional lifetime.

Figure 12:
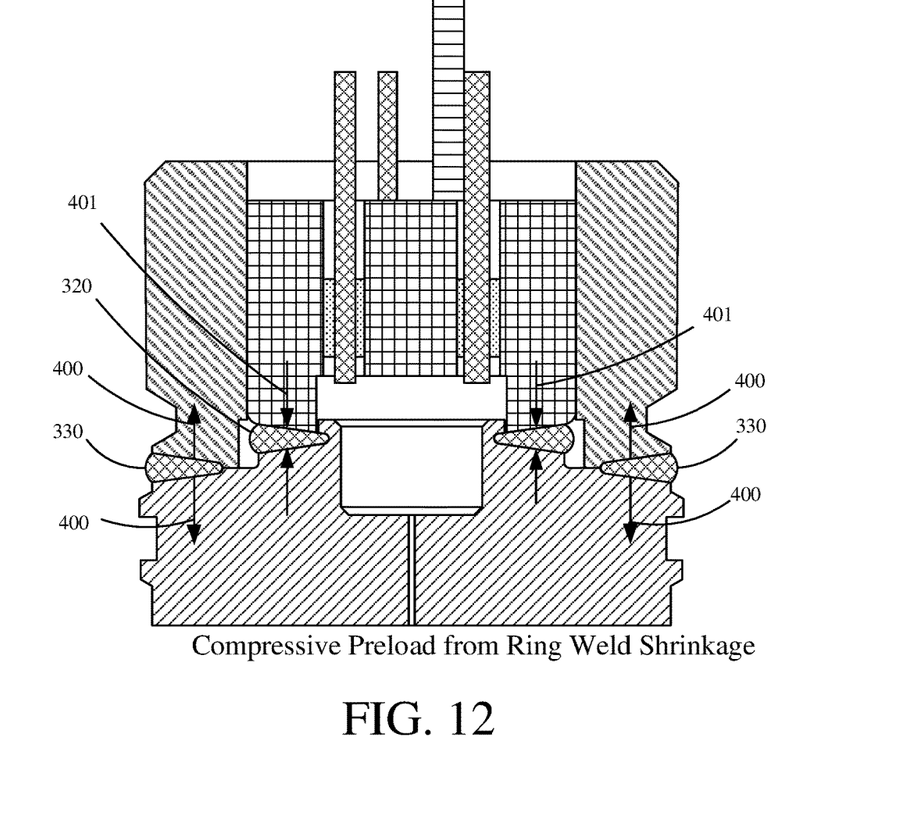
FIG. 12 is a diagrammatic view illustrating compressive preload from ring weld shrinkage in accordance with an embodiment of the present invention.

FIG. 12 is a diagrammatic view illustrating compressive preload from ring weld shrinkage in accordance with an embodiment of the present invention. As set forth above, embodiments described herein generally provide a biaxial ring welded to the isolator plug. Along with protecting the axial strain of the header weld from internal pressure, welding the biaxial ring also enables the header and header weld to be preloaded in compression due to thermal contraction of the weld 330 during cooling after the welding process. This compressive preload on weld 320 provides even more additional benefit to fatigue and high-pressure retention. FIG. 12 illustrates a tensile load 400 on weld 330 resulting from contraction during the cooling of weld 330. This results in a compressive load 401 on weld 320.

Because the biaxial ring is not a process-wetted component, it is not subject to NACE requirements. As such, this component can be made of high strength material, such as 17-4 PH or Inconel 718. If 17-4 PH is to be used, H1150 heat treat is recommended to provide the highest level of corrosion resistance, resistance to stress corrosion cracking, and weldability. Along with the capability of withstanding the hoop stresses induced from the interference fit, this differential hardness between the two mating surfaces enables a press fit free from galling or shedding. To further reduce the risk of material shedding during installation, an edge break 333 (shown in FIG. 9), such as a radius or edge taper is machined into biaxial ring 322. It is believed that press fits comprised of two soft materials (316L-316) were subject to severe galling, resulting in a diminished and compromised interference fit. Accordingly, this differential hardness is beneficial if the taper angles are slightly mismatched as the softer material will elastically conform to the profile of the harder surface.

Figure 13:
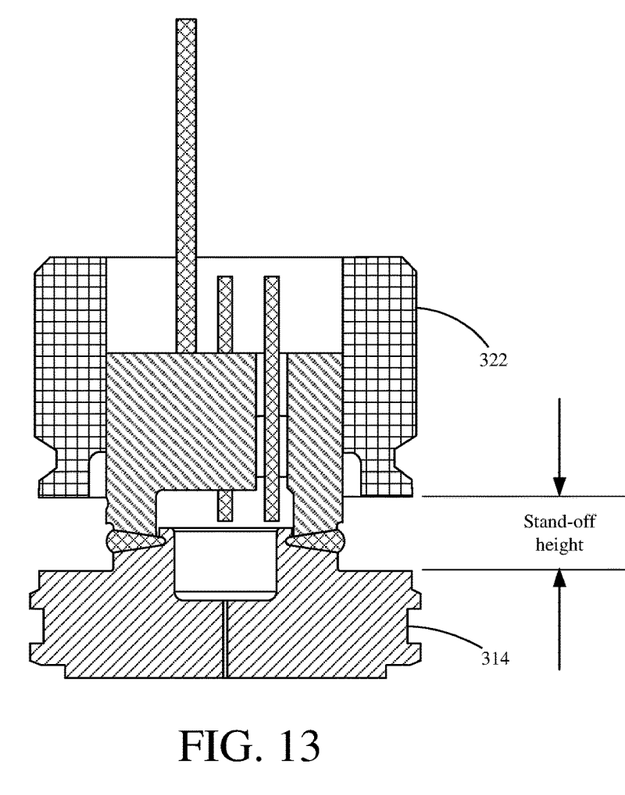
FIG. 13 is a diagrammatic cross-sectional view illustrating stand-off height as an indicator of joint interference in accordance with an embodiment of the present invention.

FIG. 13 is a diagrammatic cross-sectional view illustrating stand-off height as an indicator of joint interference in accordance with an embodiment of the present invention. Another benefit of embodiments of the present invention is that the interference of the joint can be easily inferred by measuring the stand-off height at the taper engagement. Preferably, using a plug gauge, the stand-off height (gap) between the biaxial support ring and the isolator plug at the taper engagement can be determined. FIG. 13 is a diagrammatic view of a measurement of standoff height between biaxial ring 322 and isolator plug 314. In the case for a ¼ inch/foot standard taper, every 0.100" stroke of the ring is equal to 0.002" diametrical interference. This allows prior knowledge of the effective interference, to provide an important metric of the design that can be used to determine if the interference is within the desired range prior to installing the assembly.

Figure 14:
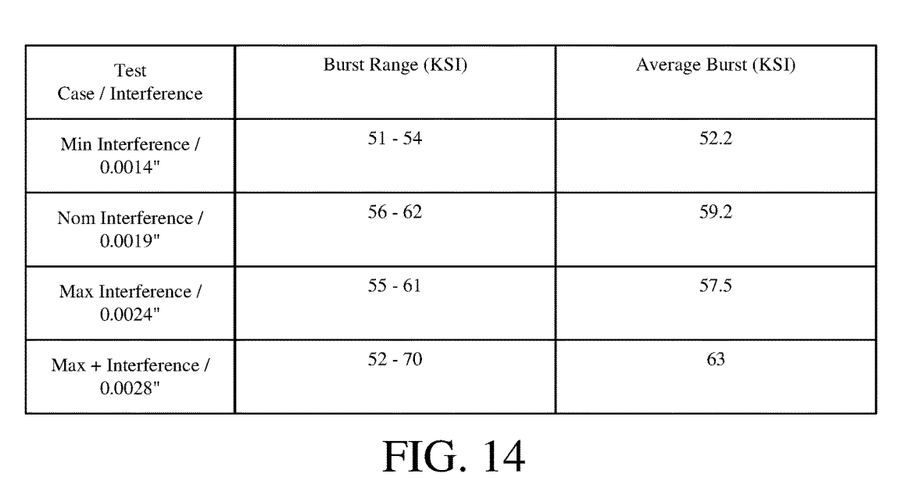
FIG. 14 is a table illustrating various burst ranges in KSI for interferences ranging from 0.0014" through 0.0028" in accordance with an embodiment of the present invention.

FIG. 14 is a table illustrating various burst ranges in KSI for interferences ranging from 0.0014" through 0.0028" in accordance with an embodiment of the present invention. Embodiments of the present invention were tested to determine burst pressure with respect to differences to interference. As can be seen, even for the minimum interference, the burst range exceeds 50 KSI.

Figure 15:
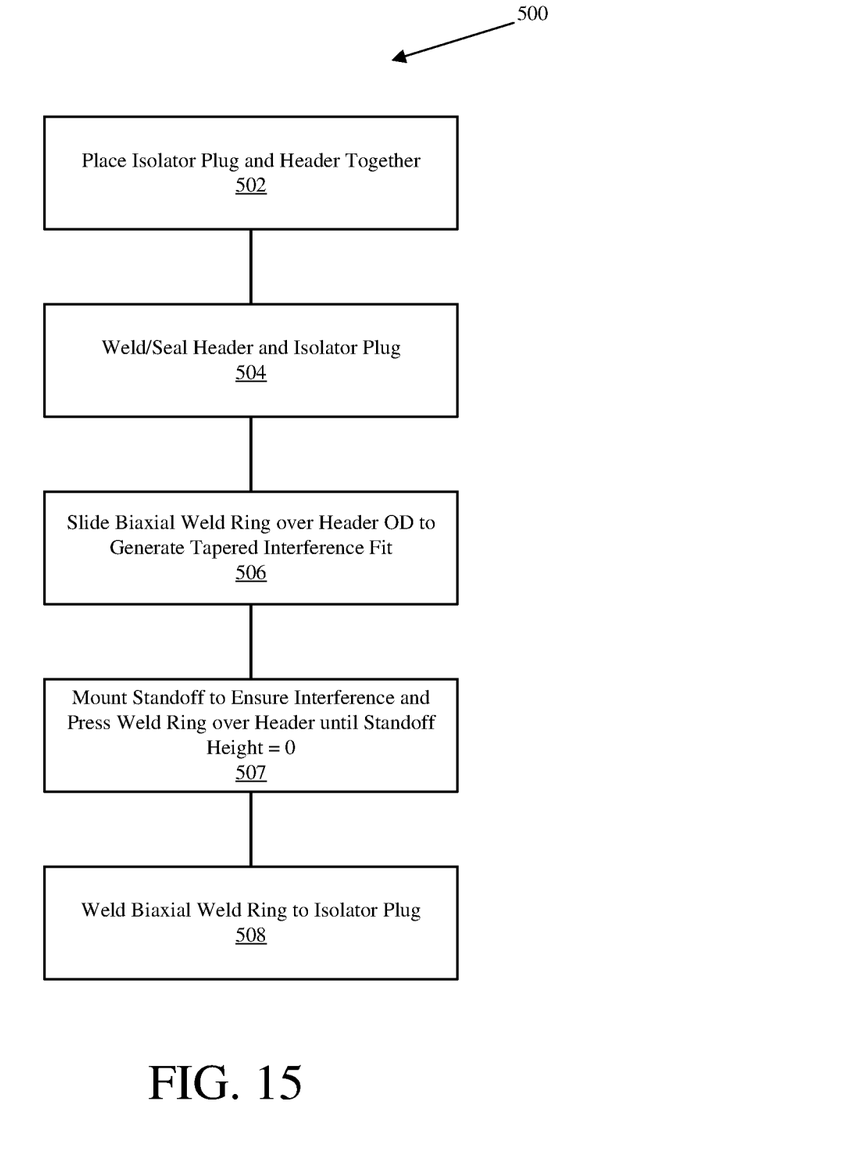
FIG. 15 is a flow diagram of a method of manufacturing a high pressure capsule and head in accordance with an embodiment of the present invention.

FIG. 15 is a flow diagram of a method of manufacturing a high pressure capsule and head in accordance with an embodiment of the present invention. Method 500 begins at block 502 where an isolator plug, such as isolator plug 314 (shown in FIG. 4) is placed together with a header, such as header 318 (shown in FIG. 4). Next, at block 504, the isolator plug and header are welded together. This weld not only mechanically fastens the isolator plug and header together, but also seals the interface therebetween. Once the header and isolator plug are welded together, method 500 proceeds to block 506 where a biaxial support ring, such as ring 322 (shown in FIG. 4) is slid over the outside diameter of the header. As set forth above, this interface is tapered so as to be self-locking. In one embodiment, the tapered interface has a radial change of 0.25 inches per axial change of 12 inches. However, those skilled in the art will recognize that variations can be made to the taper angle without departing from the spirit and scope of the invention. Further, the biaxial support ring and the header can be made (via material selection and/or heat treatment) to have a different hardness than one another. Next, at block 507, the standoff is mounted to ensure a requisite amount of interference. Then the weld ring is pressed over the header until the standoff height is reduced to zero.

Next, at block 508, the biaxial weld ring is welded to the isolator plug.

Although the present invention has been described with reference to preferred embodiments, workers skilled in the art will recognize that changes may be made in form and detail without departing from the spirit and scope of the invention. As set forth above, some embodiments have been described with respect to specific dimensions. Such descriptions are only provided in order to illustrate real world examples and relative sizes of components. Those skilled in the art will recognize that changes can be made in various dimensions and shapes without departing from the spirit and scope of the invention.

What is claimed is:

1. A pressure capsule/header assembly for a process fluid pressure transmitter the assembly comprising:
    an isolator plug having an isolation diaphragm at a first end thereof and a second end spaced from the first end, the isolator plug having a till fluid passageway fluidically coupling the first end to the second end;
    a header having a first end configured to carry a pressure sensor and a second end spaced from the first end, the header having at least one electrical interconnect extending from the first end to the second end;
    a biaxial support ring disposed about an outer surface of the header, the biaxial support ring and the header defining a tapered interference interface therebetween; and
    wherein the header is welded to the isolator plug at a first weld and the biaxial support ring is welded to the isolator plug at a location that is spaced from the second end of the header.

2. The pressure capsule/headed assembly of claim 1, wherein the tapered interference interface is configured to generate a self-locking interface.

3. The pressure capsule/header assembly of claim 1, wherein the tapered interference interface has a taper of 0.25 inches in a radial direction per 12 inches in an axial direction.

4. The pressure capsule/header assembly of claim 1, wherein the tapered interference interface is configured provides an interference between 0.0015 inches to 0.0024 inches.

5. The pressure capsule/header assembly of claim 1, and wherein the biaxial weld ring is configured to provide a die pocket that isolates heat load from the header when the biaxial support ring is welded to the isolator plug.

6. The pressure capsule/header assembly of claim 5, and wherein the die pocket has a depth greater than 0.12 inches.

7. The pressure capsule/header assembly of claim 1, and wherein the biaxial weld ring has a material hardness that is different than a material hardness of the isolator plug.

8. The pressure capsule/header assembly of claim 1, and wherein the biaxial weld ring includes an edge break configured to prevent material plowing during assembly.

9. The pressure capsule/header assembly of claim 8, and wherein the edge break is a radius.

10. The pressure capsule/header assembly of claim 1, wherein the biaxial weld ring is configured to radially compress the header.

11. The pressure capsule/header assembly of claim 1, and wherein the biaxial support ring is formed of 17-4 PH.

12. The pressure capsule/header assembly of claim 11, wherein the biaxial support ring is heat treated to condition H1150.

13. The pressure capsule/header assembly of claim 1, wherein the header is constructed from 316L stainless steel.

14. The pressure capsule/header assembly of claim 1, wherein the isolator plug is formed of 316L stainless steel.

15. The pressure capsule/header assembly of claim 1, wherein the isolator plug is formed of Alloy C-276.

16. A process fluid pressure transmitter comprising:
  a process portion having a process fluid connector configured to couple to a source of process fluid;
  an isolator plug threaded to the process portion, the isolator plug having an isolation diaphragm at a first end thereof and a second end spaced from the first end, the isolator plug having a till fluid disposed within a fill fluid passageway that fluidically couples the first end to the second end;
  a header having a first end configured to carry a pressure sensor and a second end spaced from the first end, the header having at least one electrical interconnect extending from the first end to the second end;
  a biaxial support ring disposed about an outer surface of the header, the biaxial support and header defining a tapered interference interface therebetween;
  wherein the header is welded to the isolator plug at a first weld and the biaxial support ring is welded to the isolator plug at a location that is spaced from the second end of the header; and
  a controller operably coupled to the pressure sensor and configured to provide a process fluid pressure output based on a signal from the pressure sensor.

17. The process fluid pressure transmitter of claim 16, wherein the biaxial weld ring has an externally threaded portion that is configured to be within a sensor body of the process fluid pressure transmitter.

18. The process fluid pressure transmitter of claim 16, wherein the controller is operably coupled to the pressure sensor by measurement circuitry that electrically couples to the pressure sensor via the at least one electrical interconnect.

19. The process fluid pressure transmitter of claim 16, and further comprising, loop communication circuitry coupled to the controller and configured to communicate the process fluid pressure output in accordance with a process industry communication protocol.

20. A method of manufacturing a pressure capsule/header assembly for a process fluid pressure transmitter, the method comprising:
  providing a header carrying a pressure sensor, the header being formed of metal and having at least one interconnect passing therethrough;
  providing an isolator plug having an isolation diaphragm at a first end, the isolator plug having a second end spaced from the first end, the isolator diaphragm including a fill fluid passageway fluidically coupling the first end to the second end;
  welding the header to the isolator plug proximate the second end of the isolator plug;
  providing a biaxial weld ring configured to generate a tapered interference fit with an outer surface of the header;
  placing the biaxial weld ring about the header to engage the tapered interference fit; and
  welding the biaxial weld ring to the isolator plug.

21. The method of claim 20, wherein welding the header to the isolator plug seals the header to the isolator plug.

22. The method of claim 20, wherein yielding the biaxial weld ring to the isolator plug occurs proximate the second end of the isolator plug.

23. The method of claim 20, and further comprising inspecting a degree of interference of the tapered interference fit after welding the biaxial weld ring to the isolator plug.

24. The method of claim 20, wherein inspecting the degree of interference includes measuring a standoff height between the biaxial weld ring and the isolator plug.

\* \* \* \* \*